United States Patent [19]
Meyer

[11] 3,812,750
[45] May 28, 1974

[54] AUTOMATICALLY CONTROLLED BRAKE ACTUATOR FOR UNMANNED VEHICLES

[75] Inventor: Ulrich Meyer, Lilienthal, Germany

[73] Assignee: Vereinigte Flugtechnische Werke-Fokker, Gesellschaft mit beschrankter Haftung, Bremen, Germany

[22] Filed: June 26, 1972

[21] Appl. No.: 266,094

[30] Foreign Application Priority Data
July 6, 1971 Germany............................ 7127342

[52] U.S. Cl............................... 188/106 P, 188/162
[51] Int. Cl......................... F16d 65/28, B60t 13/74
[58] Field of Search......... 188/106 F, 106 P, 106 R, 188/162

[56] References Cited
UNITED STATES PATENTS
2,251,521  8/1941  McIntyre et al. .................... 188/162

| 2,529,076 | 11/1950 | Dubreuil........................... 188/162 X |
| 2,933,159 | 4/1960 | Stiebinger......................... 188/106 P |
| 3,613,356 | 10/1971 | Woodward........................ 188/162 X |

FOREIGN PATENTS OR APPLICATIONS
678,641   7/1939   Germany ............................ 188/162

*Primary Examiner*—Duane A. Reger
*Attorney, Agent, or Firm*—Ralf H. Siegemund

[57] ABSTRACT

An actuator mechanism for installation in an unmanned vehicle and for operation of the brake pedal. The mechanism includes a pair rods driven by a motor with disk rotor and coupled thereto through gearing. A pneumatically operated emergency brake actuator can operate the pedal independently from the position of the motor driven actuator portion.

11 Claims, 5 Drawing Figures

AUTOMATICALLY CONTROLLED BRAKE ACTUATOR FOR UNMANNED VEHICLES

BACKGROUND OF THE INVENTION

The present invention relates to automatic control of brakes and here particularly to the construction of brake actuators to be used in remote controlled, unmanned vehicles. More particularly, the invention relates to brake actuation using electromagnetically operating and actuating elements which act on a regularly provided brake pedal in a vehicle and providing thereto the force as required and deemed necessary under the circumstances.

It is known generally to conduct vehicle tests by means of remote control. Endurance tests or tests for checking the behavior of a vehicle in an accident should be conducted preferably on unmanned vehicles. Therefore, the vehicle must be driven through remote control, and a test drive stand and simulator is used for obtaining and generating the needed signals for the remote control operation. Remote control for such vehicles requires particularly constructed actuators which accommodate a variety of situations and operating conditions for the controlled vehicle, and for matching such conditions with the particular actuator in the vehicle as they are normally operated by a driver.

An unmanned vehicle does, of course, include regular brakes and a regular brake pedal; one of the remotely controlled components in the vehicle will be a supplemental actuator for the brake, operating under the control of remote control signals commensurate with the various driving conditions encountered; for example, the force exerted upon the brake pedal will differ depending on the situation. In addition, it must be considered that the unmanned vehicle may encounter conditions which make it advisable to stop the test, which means that an emergency braking situation may arise under which the vehicle should come to a complete stop as fast as possible. An emergency braking situation may, for example, arise if there is a dropout or power failure for a normal drive operation, or if for reasons of instrument failure the vehicle fails to respond to commands. It can, therefore, be seen that a brake pedal actuator for an unmanned, remote controlled vehicle requires particulars which are uniquely related to the particular purpose for such an actuator. The known actuators were found to be insufficient and inadequate for meeting all of these conditions for successful operation.

DESCRIPTION OF THE INVENTION

It is an object of the present invention to avoid the deficiencies outlined above and to provide an actuator for the brake of an unmanned, remote controlled and fully maneuverable vehicle. In accordance with the preferred embodiment of the present invention, it is suggested to provide an actuator motor which is constructed to have a disc-shaped rotor, and a flanged tachometer generator is fixedly coupled to that motor for running therewith and for establishing an integrated motor-motor speed indicating unit. The rotor has a drive shaft which is provided with or is geared to a pinion meshing a rack, and the rack is connected to or is part of an actuator rod, which is coupled to a brake actuator plate; the entire arrangement is mounted so that the latter plate may engage the brake pedal. An emergency brake actuating device is provided having a rod that acts also onto that brake pedal actuator plate and for independent operation thereof.

It is advisable to have the drive shaft of the motor geared to an intermediate or control shaft carrying two spaced-apart gears. These gears mesh two racks being part of or cooperating with two actuator rods which act on the brake actuator plate. The emergency brake actuator is disposed inbetween these two racks and actuator rods. The emergency brake actuator includes preferably a piston cylinder unit pressurized from a suitable store of pressure fluid (e.g., air) in case of an emergency, and acting on the brake pedal actuator plate independently from the motor driven actuator rods.

It was found that the force provided to the brake pedal by the novel actuator mechanism is subjected to control over a very large range. This was found to be particularly so because the motor with disc rotor has low mass and, therefore, small inertion and will react very speedily to any electrical command to obtain optimum control and follow-up conditions. The tachometer as coupled to the motor provides a rate signal for the position control of the brake actuator which quickens the response.

The brake actuator is constructed so that the emergency brake can be released in any position of the brake control as far as the electrical system is concerned. On one hand, the pedal actuator plate is subjected to the force of the rod as it is controlled by the emergency brake, while, on the other hand, the rack operated rods of the electrically actuated brake system are also coupled thereto, but will disengage in case of emergency braking. In order to compensate for differently directed displacements, as between brake pedal and brake pedal actuator plate, a set of rolls may be provided for engagement with the brake pedal.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a front elevation of a brake actuator as installed in an unmanned vehicle;

FIG. 2 is a top elevation of the actuator arrangement in accordance with FIG. 1;

FIG. 3 is a side elevation of the device shown in FIGS. 1 and 2; and

FIG. 4 is divided two Figures, 4a and 4b, which show two longitudinal sections of the actuator in FIGS. 1, 2 and 3, and in two parallel planes as indicated in FIG. 3.

DESCRIPTION OF THE DRAWINGS

Proceeding now to the detailed description of the drawings, there is illustrated an interior portion of an unmanned vehicle equipped with a brake actuator in accordance with the preferred embodiment of the present invention. A frame 12 for the actuator is mounted to a stand or base 11 by means of four tension locks 15. Base 11 is bolted down to the floor 10 of a vehicle. An electro-motor 13 is mounted in the bottom portion of frame 12. Motor 13 has a disc-shaped rotor, and a tachometer generator 14 is flanged to the motor housing and is driven directly from the motor drive shaft; they may have a common shaft.

The drive shaft of motor 13 projects beyond the motor casing and carries a gear 16, meshing a gear 17 which sits on an intermediate control shaft 18. Shaft 18 is journalled in frame 12 by means of suitable bearings and is sitauted above motor 13. Therefore, control shaft 18 is driven by motor 13 which is the principle brake actuator motor. Two additional gears 20 and 21 are secured to shaft 18 at a predetermined distance from each other, and they rotate in strict synchronism with each other. The gears 20 and 21 respectively mesh two racks 22 and 23. These racks 22 and 23 respectively are part of actuator rods 25 and 26, which are displaced upon rotation of the motor 13 for brake pedal actuation. The ends of these rods 25 and 26 are provided with bores 27 and 28, which are colinear with the respective direction of displacement of the rods 25, 26.

Actuator plate 30 is provided with two suitably located pins 31 and 32, each having a notch in its front end. These pins 31 and 32 are respectively inserted in bores 27 and 28. Spring biased balls 33 (the bias being provided by springs 34) engage the respective notches in pins 31 and 32, and thus, releasably lock the rods 25 and 26 to the actuator plate 30. In order to reduce friction, rods 25 and 26 are mounted respectively in axially effective ball bearings 36.

A swivel or pivot coupler having a set of rolls 8 is directly mounted to the pedal 5 for immediate engagement with the actuator plate 30. These rolls permit relative displacement between plate 30 and pedal 5, normal to actuation movement, so that such transverse displacement will not impede the needed actuator-pedal movement.

Figure 1:
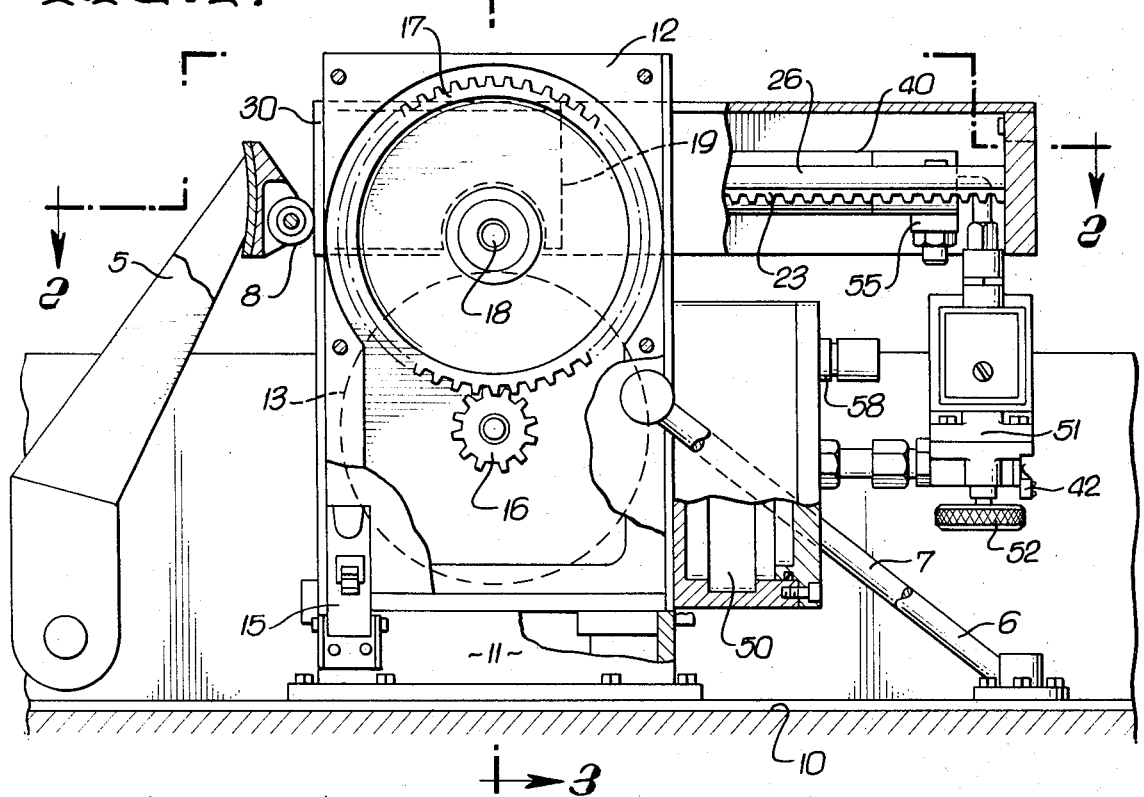
Figure 2:
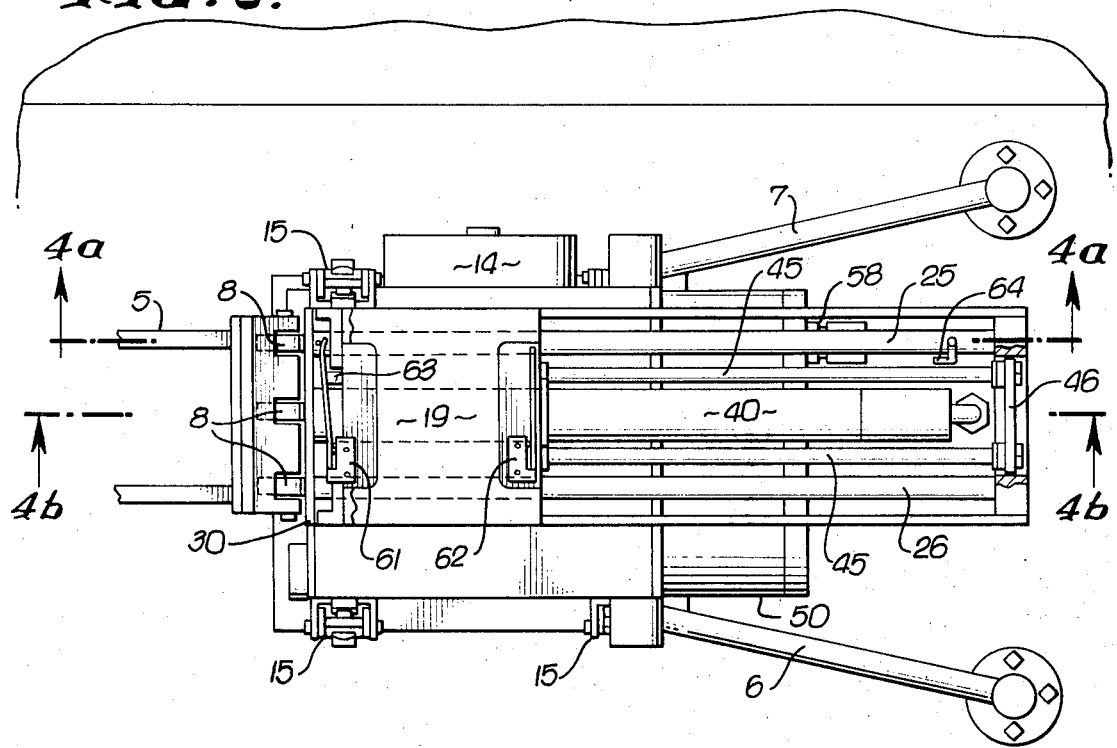
Figure 3:
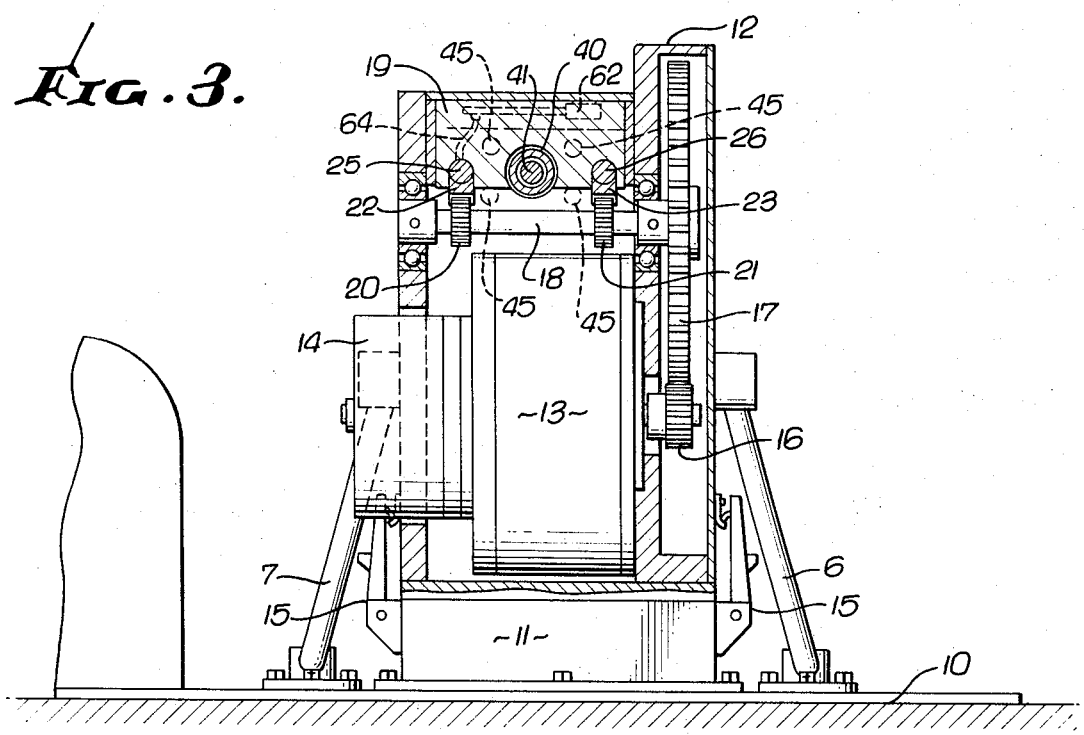
Figure 4A:
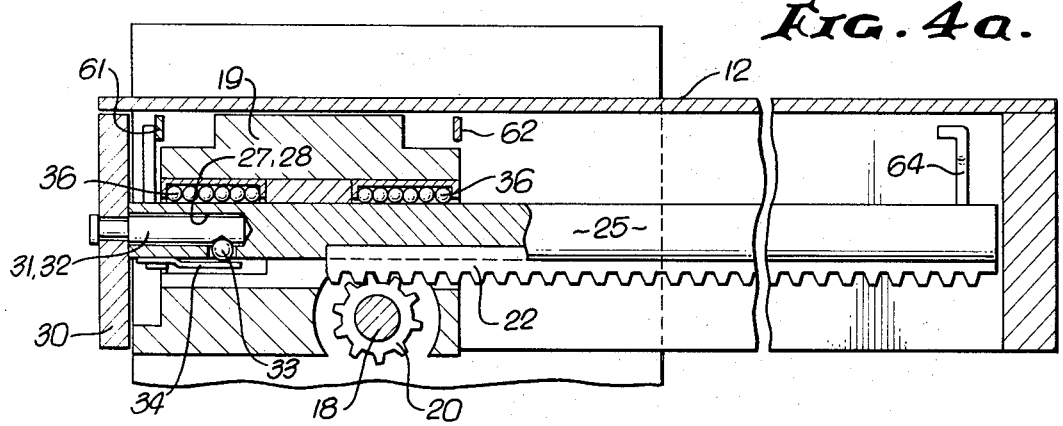
FIGS. 4a and 4b illustrate this particular feature in greater detail.
Figure 4B:
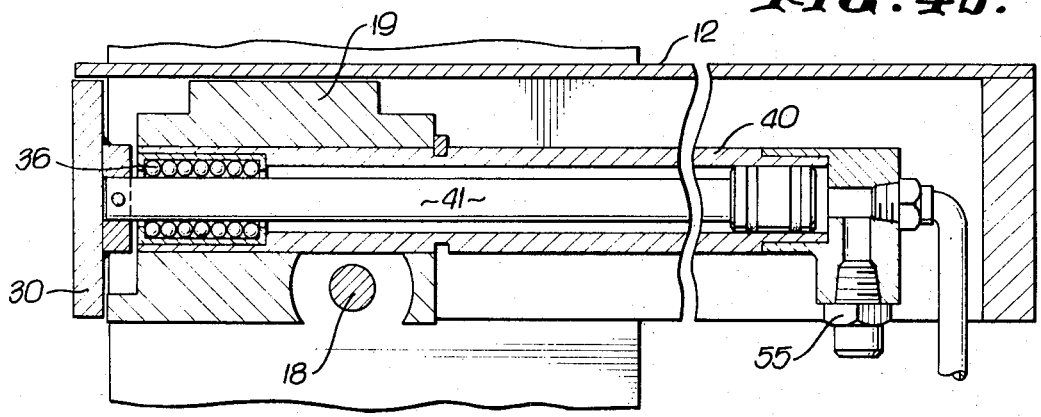

An emergency brake actuator mechanism is disposed between the guide rods 25 and 26. The emergency arrangement includes a piston cylinder arrangement 4, with a piston rod 41, acting directly upon the actuator plate 30. FIG. 4b illustrates the piston cylinder arrangment 40 in greater detail, and it can be seen that four support and stabilizing rods 45 are arrange around the piston cylinder unit in order to provide for sufficient stiffness. The four rods 45 are bolted to a U-shaped plate 46 partially enclosing piston cylinder 40. The front ends of the guide rodes 45 are mounted again in axial ball-bearing type sleeves for reducing friction of axial displacement. These several ball-bearing type sleeves, or linear, or axial ball bearings, are mounted in a mounting and support block 19, which is secured to frame 12 and can be considered as being a part thereof. Two thrust rods 6 and 7 extend from the rear of block 19; they have a somewhat inclined position laterally as well as downwardly, and they bear against correspondingly constructed thrust bearings or mounts 3 and 4, which are themselves mounted directly to the bottom of floor 10 of the vehicle, or they are mounted on the frame 12 as it is bolted to the vehicle.

The emergency actuator 40 is pneumatically operated and, therefore, can be powered from a pressurized gas storage tank 50. If a failure of any kind occurs, or if an emergency state is commanded externally, the emergency brake is released in that a magnetic valve 51 opens a passage between fluid tank 50 and the emergency brake cylinder for rapidly pressurizing the cylinder, and the rod 41 will push immediately the brake actuator against the brake pedal at maximum available force.

The magnetically operated valve 51 is manually adjustable, i.e., closable by means of a hand wheel 52. This hand wheel is provided to prevent emergency brake operation in case the entire device is intentionally stopped without an emergency condition, or prior to putting the device into operation.

It will be realized that, for example, the magnetic valve 51 opens passage for the pressure gas in case of de-energization of the electromagnetic valve closing circuit. In other words, the valve closes the conduit for pressure fluid to the emergency brake cylinder only as long as energizing current flows in the valve operating circuit. Alternatively, the valve is blocked upon changing the adjustment position of the manually operated wheel 52. Upon manually opening the valve, a micro switch 42 is operated to turn on the current for the valve circuit so that the valve is now kept closed electromagnetically, unless or until there is current failure in the circuit. The piston cylinder drive 40 is additionally provided with a venting valve 55, in order to discharge the gas from the cylinder after an emergency braking operation has taken place.

Limit switches 61 and 62 are provided for disconnecting motor 13, upon brake actuation to preset limits, which are regarded as error situations. The limit switch 61 will be actuated upon complete retraction of the actuator rods, but only if the emergency device had not responded! A follower 63 is provided on the guide rod 25 to operate switch 61. The limit switch 62 is operated by a follower 64, mounted to the plate 46, which, it will be recalled, mounts one end of each of the rods 45, as pertaining to the cylinder unit 40. Switch 62 is operated upon complete protaction of actuator rods 25 and 26.

It can readily be seen that the motor 13 is the main brake actuator. Therefore, motor 13 is used for controlling normal braking operation; that is to say the motor 13 is energized in response to a remotely issued brake command for the unmanned vehicle, and motor 13 will de-energize or reverse, if the operator for the remote control operation releases his brake command. The integral tachometer generator 14 provides a voltage in any instant proportional to the motor speed and which, therefore, is proportional to the actuator speed as it is, in fact, imparted upon the brake pedal. The motor voltage is fed to a control unit (not shown), which provides for follower operation in feedback configuration for actuating and operating motor 13. The signal as provided by the tachometer generator can be used to quicken the motor response to an external command signal, and that permits optimization of the follower control operation.

Normal braking commands cause motor 13 to run in one direction, and since its drive shaft is geared to the intermediate control shaft 18, pinions 20 and 21 will drive the two racks 22 and 23 in unison. These two racks are integral with actuator rods 25 and 26 and push brake actuator plate 30 so as to push brake pedal 5 down, just as a human operation would do. The resulting motion of the brake pedal 5 is not quite colinear with the particular displacement of the actuator plate 30, but rollers 8 will compensate any lateral displacement component as between plate 30 and pedal 5.

In case an emergency arises, or if, for example, the electrical brake system fails for some reason or another, the emergency brake will be triggered in that the magnetic valve 51 responds as intentionally commanded or just because of current failure in the circuit that blocks the pneumatic passage of this emergency system. The response of the magnetic valve 51 and of rod 41 is independent from the position of the brake actuator mechanism. The cylinder 40 will receive pressurized gas from source 50, and piston rod 41 will then be advanced, so as to push against actuator plate 30, which will disengage from the rods 25 and 26, and will force the brake pedal 4 down independently from the electrical brake actuator system!

The plate 30 is normally coupled to the rods 25 and 26 by means of the pins 31 and 32, etc. However, as the piston rod 41, when pushing against the actuator plate 30, pins 31 and 32 are pulled out of bores 27 and 28 because the pushing force of rod 41 is sufficient to overcome the spring bias for balls 33, so that these locking balls will be pulled out of the notches by the pins 31, 32. After successful completion of emergency braking, and after the disturbance that caused the emergency to respond, has been removed, the valve 55 is opened to vent the cylinder 40, and the actuator can be returned to normal operation.

The source of gas 50 which provides the pressurized gas is metered for emergency operation. An inlet stud 58 is provided for connecting tank 50 to an external source of pressurized gas supply, so that the gas content in tank 50 can be replenished. In order to make sure that the required force is available in case of an emergency brake, a pressure switch is provided which responds to a dropping of the pressure in tank 50 below a value that is needed for effecting sufficiently strong brake operation. That switch furnishes a signal, (e.g., a telemetric signal to the test stand), indicating the need for replenishing the source 50. The filling and testing equipment used for charging tank 50 with pressurized gas can be made controllable to adjust the pressure available in the tank, so that the brake force available for the emergency situation can be adjusted to particular expected conditions as they may arise under the specific test conditions of the vehicle.

In view of the fact that the entire actuator is mounted in a frame, and that the frame (12) is connected to the vehicle through reasonable tension lock, the equipment can be installed quite rapidly and it may be removed from the vehicle quickly, if the need arises. The casing or frame 12 may be provided with particular plugs, and there may be provided suitable counter plugs in the vehicle so that, upon placing the frame 12 into position and locking it, electric power is provided to the electrical components in the actuator unit. The thrust rods 6 and 7 support the frame upon braking so as to reaction forces experienced by the actuator unit in case of sudden braking. These support rods bear against thrust bearings, which may be part of the initial equipment of the test vehicle. Rods 6 and 7 may even be hinged and they do not impede at all fast installation of the unit.

The invention is not limited to the embodiments described above, but all changes and modifications thereof not constituting departures from the spirit and scope of the invention are intended to be included.

I claim:

1. A brake actuator for installation in an unmanned vehicle and for operating a brake pedal therein independent from foot actuation by a person, comprising:

an electric motor having a flat disc motor with drive shaft;
a tachometer generator flanged to the motor and running therewith for feedback signalling;
at least one rack and pinion arrangement;
gearing means drivingly coupling the pinion to the drive shaft of the motor;
an actuator rod connected to or being part of the rack and displaced therewith upon rotation of the motor as driving the pinion via the gearing means;

an actuator rod connected to or being part of the rack and displaced therewith upon rotation of the motor as driving the pinion via the gearing means;

an actuator plate releasably mounted to the rod and advancing and retracting therewith for engagement with, seating on and actuation of the brake pedal; and
an hydraulic emergency brake actuator having a rod coupled to the brake pedal actuator plate for operating the actuator plate independently from the motor and from the motor driven actuator rod the actuator plate being released from the rod by the emergency brake actuator when actuated.

2. A brake actuator as in claim 1, the gearing means including a control shaft geared to the drive shaft and carrying a pair of spaced-apart pinons; one of the pinions being the pinion of said one rack and pinion arrangement; two racks respectively meshing the pinions, one rack thereof being said one rack of said rack and pinion arrangement, the racks mounted to a pair of actuator rods including the one actuator rod, the actuator rods being spaced-apart and operating said actuator plate in unison, said emergency brake actuator with rod being disposed in-between the said actuator rods.

3. The brake actuators as in claim 1, said emergency brake including a piston cylinder arrangement, a piston rod coupled to the piston of the piston cylinder arrangement, the emergency brake further including a source of pressure fluid, fluid conductively coupled to the cylinder of the emergency brake cylinder arrangement for pressurizing the cylinder so that the piston thereof pushes the emergency brake rod for operating the actuator plate.

4. The brake actuator as in claim 3, including a manually operable element, including a switch for temporarily blocking release of the emergency brake.

5. Actuator as in claim 2, the actuator rods having front ends, there being coaxial bores in the front ends of the rods, a pair of pins on the actuator plate respectively for insertion in said bores; and detent means including spring biased balls for releasably securing the pins in the bores.

6. Actuator as in claim 1, including roll means mounted on the brake pedal for engagement with that actuator plate to compensate lateral displacement components as between the pedal and the actuator plate upon actuation of the latter.

7. Actuator as in claim 1, wherein the emergency brake includes the piston cylinder arrangement with a piston rod operated by the piston and disposed for engaging said brake pedal actuator, four symmetrically disposed support rods arranged around the cylinder and extending longitudinally as well as parallel thereto, and a mounting plate for said four rods having U-shaped profile, the legs of the U extending next to the cylinder.

8. Actuator as in claim 1, wherein said emergency rod and said actuator rod being mounted in longitudinal ball bearings.

9. Actuator as in claim 1, including a pair of limit switches and a follower displaced in response to operation of the motor and cooperating with a stationary element for obtaining limit switch operation for governing the range of actuator displacement.

10. Actuator as in claim 1, including a frame for mounting said motor, said actuator rod, said actuator plate and said emergency brake, and tension lock means for releasably mounting the frame to the vehicle.

11. The brake actuator as in claim 10, including thrust rods engaging the frame and anchored in thrust bearings in said vehicle to provide reaction against braking inertia.

* * * * *